United States Patent
Khan et al.

(10) Patent No.: US 8,994,338 B2
(45) Date of Patent: Mar. 31, 2015

(54) DUAL-CHARGER SYSTEM

(75) Inventors: Aftab Ali Khan, Dearborn, MI (US); Stephen Humphrey, Livonia, MI (US); Michael Hardy, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 288 days.

(21) Appl. No.: 13/330,496

(22) Filed: Dec. 19, 2011

(65) Prior Publication Data

US 2012/0181983 A1    Jul. 19, 2012

Related U.S. Application Data

(60) Provisional application No. 61/432,876, filed on Jan. 14, 2011.

(51) Int. Cl.
*H02J 7/00* (2006.01)
*B60L 11/18* (2006.01)

(52) U.S. Cl.
CPC ........... *H02J 7/0055* (2013.01); *B60L 11/1816* (2013.01); *Y02T 10/7088* (2013.01); *Y02T 10/7005* (2013.01); *Y02T 90/121* (2013.01); *Y02T 90/14* (2013.01)
USPC ......................................... 320/138; 307/10.1

(58) Field of Classification Search
CPC .......................... B60L 11/1816; H02J 7/0055
USPC ......... 320/109, 138, 104, 106, 128; 307/10.1, 307/18; 340/455
See application file for complete search history.

(56) References Cited

U.S. PATENT DOCUMENTS

| | | | |
|---|---|---|---|
| 5,323,099 A | 6/1994 | Bruni et al. | |
| 6,664,762 B2 | 12/2003 | Kutkut | |
| 7,554,292 B2 * | 6/2009 | Veselic | 320/116 |
| 7,615,900 B1 | 11/2009 | Harris | |
| 7,683,576 B2 * | 3/2010 | Tien et al. | 320/128 |
| 7,847,521 B2 | 12/2010 | Lida | |
| 8,319,478 B2 * | 11/2012 | Humphrey et al. | 320/138 |
| 2008/0257620 A1 | 10/2008 | Poulsen | |
| 2009/0045775 A1 | 2/2009 | Popescu Stanesti et al. | |
| 2009/0115375 A1 | 5/2009 | Iida | |
| 2009/0212738 A1 | 8/2009 | Coonan et al. | |
| 2009/0251106 A1 | 10/2009 | Samstad | |
| 2011/0055037 A1 | 3/2011 | Hayashigawa et al. | |
| 2011/0304298 A1 * | 12/2011 | Gow et al. | 320/107 |
| 2012/0181983 A1 | 7/2012 | Khan et al. | |

FOREIGN PATENT DOCUMENTS

| | | |
|---|---|---|
| CN | 101428568 | 5/2009 |
| JP | 20000294298 | 10/2000 |

OTHER PUBLICATIONS

Chinese Office Action for Japanese Application 201210009887.1 dated Dec. 20, 2013.

* cited by examiner

*Primary Examiner* — Richard V Muralidar
(74) *Attorney, Agent, or Firm* — Brooks Kushman P.C.

(57) ABSTRACT

A charger system for use in a vehicle to charge a vehicle battery includes a first charger and a second charger. The chargers are connected to a vehicle bus. Each charger has a master indication digital input and decodes the input to determine its role as master charger or slave charger. The master charger configures its connection to the vehicle bus to use a master node message set. The slave charger configures its connection to the vehicle bus to use a slave node message set.

10 Claims, 6 Drawing Sheets

DUAL-CHARGER SYSTEM

CROSS-REFERENCE TO RELATED APPLICATIONS

This application claims the benefit of U.S. provisional Application No. 61/432,876 filed Jan. 14, 2011, the disclosure of which is incorporated in its entirety by reference herein.

BACKGROUND

1. Technical Field

The present invention relates to chargers used to facilitate charging a battery, such as but not limited to chargers of the type found in vehicles to charge a vehicle battery with energy provided from a source outside of the vehicle.

2. Background Art

Hybrid electric vehicles, electric vehicles, and other types of vehicles or devices that otherwise provide some level of vehicle propulsion with an electric motor may include a battery to source the electric energy needed to power the electric motor. In some cases, the battery may be charged with energy provided from a source outside of the vehicle, such as with energy provided through a wall outlet, charging station, electric vehicle supply equipment (EVSE), etc. Because the battery requires energy provided from the source outside of the vehicle to be regulated before it can be used to charge the battery, a need exists for a charger system to prepare the source energy for use in charging the battery.

SUMMARY

In one embodiment, a charger system for use in a vehicle to charge a vehicle battery is provided. The charger system comprises a first charger configured to connect to a vehicle bus, having a first master indication digital input, and being configured to decode the first master indication digital input to determine a first role as either a master charger or a slave charger. When the first role is determined as the master charger the first charger configures the connection to the vehicle bus to use a master node message set. When the first role is determined as the slave charger the first charger configures the connection to the vehicle bus to use a slave node message set.

The charger system further comprises a second charger configured to connect to the vehicle bus, having a second master indication digital input, and being configured to decode the second master indication digital input to determine a second role as either a master charger or a slave charger. When the second role is determined as the master charger the second charger configures the connection to the vehicle bus to use the master node message set. When the second role is determined as the slave charger the second charger configures the connection to the vehicle bus to use the slave node message set.

At the more detailed level, embodiments of the invention may include various additional features. In one feature, the charger system further comprises a vehicle wiring harness connected to the first charger and connected to the second charger. The vehicle wiring harness is configured to connect the first charger and the second charger to the vehicle bus.

In another feature, the vehicle wiring harness is configured such that a pair of wires connects to the first master indication digital input. The pair of wires also connects to the second master indication digital input in a reversed configuration.

In another feature, a master charger using the master node message set receives commands from a battery management system and sends commands to a slave charger. The slave charger receives commands from the master charger.

In another embodiment, a charger system for use in a vehicle to charge a vehicle battery comprises a first charger configured to connect to a vehicle bus, and a second charger configured to connect to the vehicle bus. The first charger and the second charger are configured to communicate with each other and agree on which charger is a master charger, with the other charger being a slave charger. When a particular charger is the master charger, the particular charger configures its connection to the vehicle bus to use a master node message set. When the particular charger is the slave charger, the particular charger configures its connection to the vehicle bus to use the slave node message set.

In one possible implementation, the first charger and the second charger are configured to communicate their serial numbers, and which charger is the master charger is determined based on the serial numbers. In another possible implementation, the first charger and the second charger are configured to each communicate a random number, and which charger is the master charger is determined based on the random numbers.

In another embodiment, a charger system for use in a vehicle to charge a vehicle battery comprises a first charger configured to connect to a vehicle bus, and configured as a master charger to use a master node message set. The charger system further comprises a second charger configured to connect to the vehicle bus, and configured as a slave charger to use a slave node message set. The master charger using the master node message set receives commands from a battery management system and sends commands to the slave charger. The slave charger receives commands from the master charger.

BRIEF DESCRIPTION OF THE DRAWINGS

However, other features of the present invention may become more apparent and the present invention may be best understood by referring to the following detailed description in conjunction with the accompany drawings in which.

DETAILED DESCRIPTION

Figure 1:
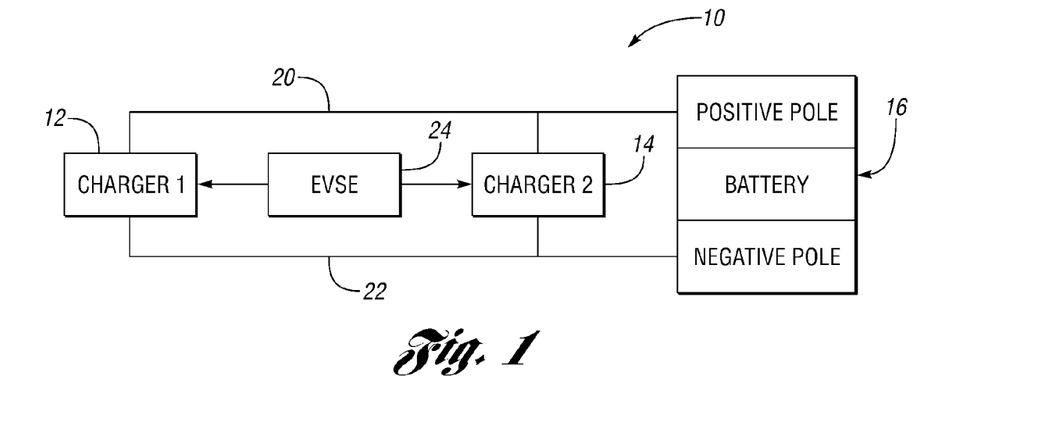
FIG. 1 illustrates a dual-charger system in accordance with one non-limiting aspect of the present invention.

FIG. 1 illustrates a dual-charger system 10 in accordance with one non-limiting aspect of the present invention. The system 10 is shown to include a first charger 12 and second charger 14 connected parallel to a battery 16 included within a vehicle (not shown). The first and second chargers 12, 14 may include positive and negative output that commonly connect to positive and negative poles of the battery by way of positive and negative connected cables 20, 22. The first and second chargers 12, 14 may include an input to a receptacle included in the vehicle to which a cordset used to connect to a wall outlet or other electric vehicle supply equipment (EVSE) 24 may connected in order to provide energy to the first and second chargers 12, 14 for manipulation prior to being used to charge the battery 16.

While the first and second chargers 12, 14 are shown to be commonly connected to the connecting cables 20, 22, any number of other configurations may be used to connect the chargers 12, 14 in parallel to the battery 16. This exemplary connection configuration is not intended to unnecessarily limit the scope and contemplation of the present invention. The present invention is predominately described with respect to the EVSE 24 providing AC energy to each of the first and second chargers 12, 14 that is then to be converted by the first and second chargers 12, 14 to DC energy sufficient to charge the battery 16. This, also, is done for exemplary purposes and without intending to unnecessarily limit the scope and contemplation of the present invention as the present invention fully contemplates any number of configurations for providing AC or DC energy to the chargers 12, 14 for use in charging the battery 16.

The dual-charger system 10 allows for shorter charging time since one charger is not responsible for meeting all current demands, and in the event current demand is high, the use of two chargers 12, 14 to meet the corresponding demand may be quicker than a single charger arrangement since the current demand increases can be spread across both chargers 12, 14. In the event future charging demands are greater, the dual-charger system 10 may be scaled to include additional chargers (e.g., three, four or more chargers connected in parallel). Optionally, the first and second chargers 12, 14 may be identical (same hardware, software, part number, CAN database, etc) in order to simplify manufacturing as well as end customer assembly. The first and second chargers 12, 14 may be operable to directly handle handshaking signals such as control pilot and proximity detect as defined in SAE J1772, such as by replicating or passing through instructions set to one charger to the other.

Optionally, from the viewpoint of a vehicle control module or other vehicle-based controller or module tasked with coordinating activities of various vehicle systems and subsystems, the dual charger system 10 may appear as a single unit, i.e., as if the first and second chargers 12, 14 appeared on a vehicle bus (not shown) and to other vehicle controls as a single charger. In this manner, the vehicle can send a single command to the charging system 10 and expect in return a single set of statuses, which can be used to remove the burden of controlling two separate chargers 12, 14 from the vehicle, and makes scaling the system from one to two chargers a matter of changing a wire harness.

The appearance of a single-charger may be facilitated with one charger 12 taking on the role of master, and performing load balancing of the charging system 10, while other charger 14 acts as in the role of slave. This entails determining if one or both chargers 12, 14 are required to generate the requested output from the vehicle. If only a single charger 12, 14 is required to meet the requested output, i.e. the charging voltage and charging current desired to charge the battery 16, then the master can randomly select between itself and the second charger to handle the task. By using a single charger it increases the efficiency of the system 10, and by randomly selecting between the two chargers 12, 14, the life of the system 10 can be extended by spreading the utilization across both chargers equally.

In the event both chargers 12, 14 are required to meet the requested output demand, then the master charger 12 may perform load balancing to distribute the load between the two chargers 12, 14. It may essentially set both chargers 12, 14 output voltages to the requested value, and set each charger 12, 14 to provide half the requested current. One of the chargers 12 may be placed in voltage limiting mode while the other charger 14 may be placed in current limiting mode, thereafter, to account of output variations of the other charger 12. In this manner, the voltage from one charger 14 can be unregulated and the voltage from the charger 12 can be regulated to compensate for variations in the unregulated voltage. A similar current control strategy can be employed such that current output from one charger 12 is unregulated while the current from the other charger 14 is regulated as a function thereof.

Figure 2:
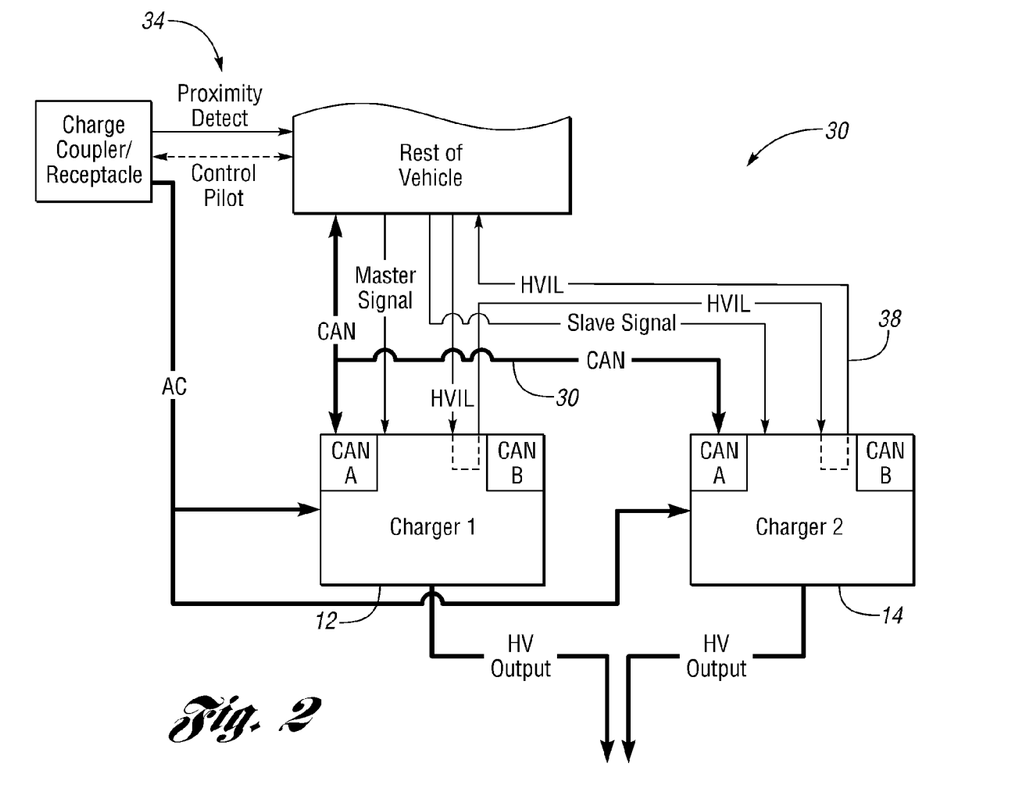
FIG. 2 illustrates a direct connection arrangement in accordance with one non-limiting aspect of the present invention.

FIG. 2 illustrates a direct connection arrangement 30 of the first and second chargers 12, 14 in accordance with one non-limiting aspect of the present invention. The system 30 is shown with the first and second chargers 12, 14 connecting directly to a vehicle bus 32. Hardware inputs and outputs (I/O) present in the vehicle bus 32 provide an indication of which charger 12, 14 may be a master and which charger may be a slave. These inputs may be checked on power up, and their state may be used to configure the set of CAN messages that the charger 12, 14 may transmit and receive based on its defined role. Also, in this type of system 30, the control pilot and proximity signals 34 from the cordset may be handled by some other module in the vehicle.

In the multiple charger ECU control system, i.e., where each charger 12, 14 includes an ECU, the role of the two chargers 12, 14 may be determined via hardware signals in the harness (shown as master signal and slave signal). This can be accomplished by one or more digital inputs (high=master, low=slave for example). One input value may be defined to be for the master, and all other input value combinations may be defined to be for the slave. The master charger 12 may have the responsibility of processing the output request from the vehicle and transmitting a special slave charger command message to the second slave charger 14 in order to control it. It may then have to receive the slave charger's status and combine it with its own status and send a single charging system status message back to the vehicle. While the slave charger command and status messages may be present on the vehicle bus 30, they may be used for inter-charger communication and ignored by the rest of the vehicle.

As with many vehicle electronic control modules, the ability to reprogram the unit over the vehicle bus 30 as well as diagnose issues in the units is important for service. Each charger 12, 14 may be defined to have a unique set of diagnostic IDs, allowing each charger 12, 14 to be targeted individually for troubleshooting and reprogramming. A high voltage interlock (HVIL) signal 38 is shown to travel between the vehicle bus 30, first charger 12 and second charger 14. The HVIL signal 38 may be pulse-train that continuous travels between each device and used to detect errors or other disruptions that result in interruptions to the pulse-train.

Figure 3:
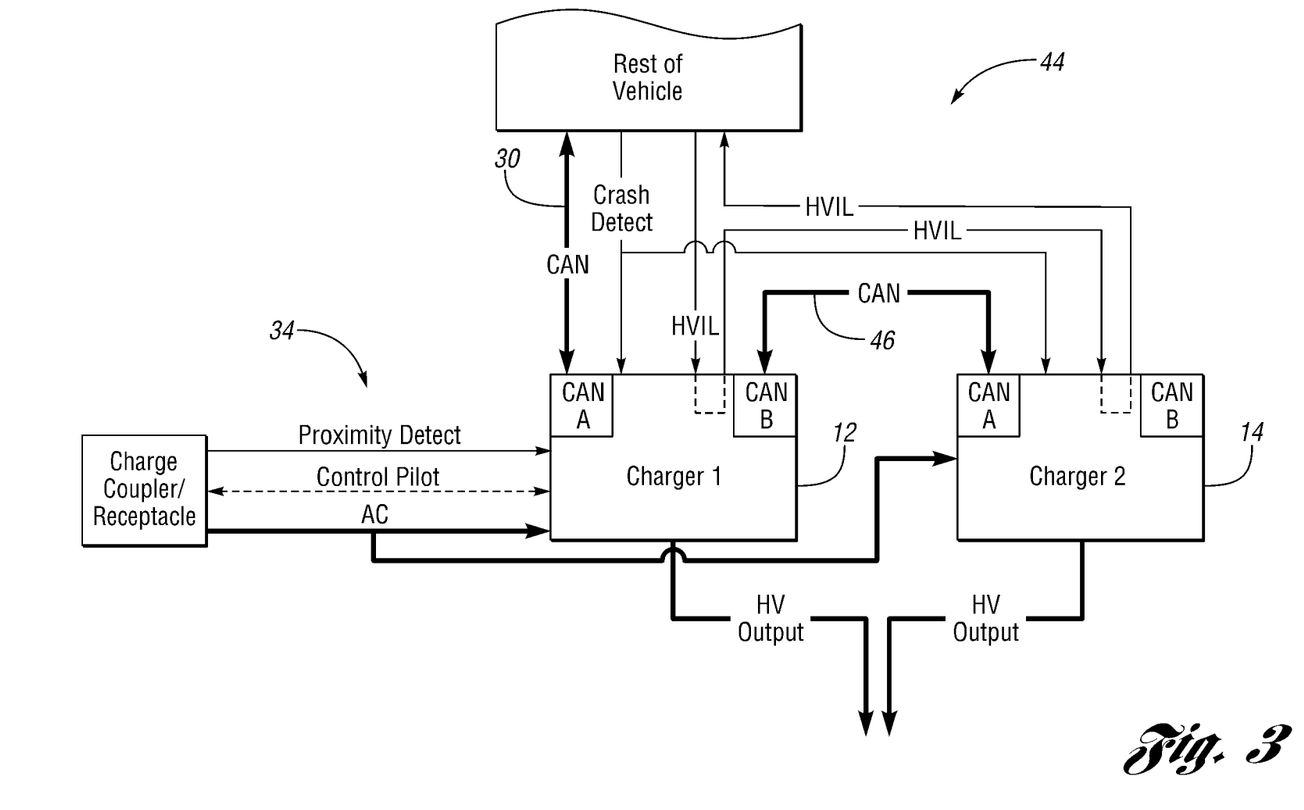
FIG. 3 illustrates a cascaded connection arrangement in accordance with one non-limiting aspect of the present invention.

FIG. 3 illustrates a cascaded connection arrangement 44 of the first and second chargers 12, 14 in accordance with one non-limiting aspect of the present invention. In this arrangement 44, only the first charger (the master) 12 is connected directly to the vehicle bus 30 as the second charger (the slave) 14 is "daisy chained" to the first charger 12 via a second CAN channel 46. This connection scheme results in the first charger 12 acting as a gateway for the second charger 14 and without the second charger 14 having to be aware of the existence of the first charger 12. The second charger 14 may behave as a standalone charger with the exception that its control pilot and proximity detect signals 34 may be overridden with CAN signals since these signals may not be physically connected to multiple chargers.

Figure 4:
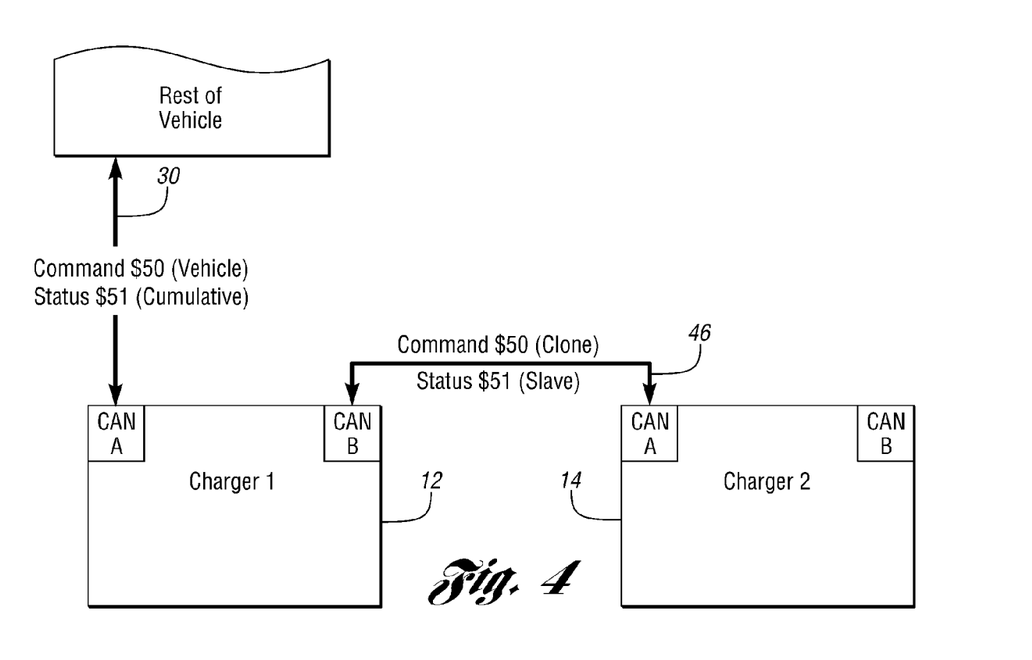
FIGS. 4-7 illustrate vehicle message communications in accordance with non-limiting aspects of the present invention.

In the cascaded control system 44, the master charger 12 may behave as a standalone charger 12 until it detects communication from a second charger 14 on its CAN B bus. When this occurs, first charger may become a master. The second charger 14, may become the slave, and essentially operate the exact same as a single charger would when connected directly to the vehicle. For charging control, it may be assumed that the vehicle may send a single command ($50) to what is believed to be a single charger and expect a single status response ($51) back, all via CAN A, as shown in FIG. 4. By default, all chargers may operate in the "slave" mode, simply taking in the command ($50) and returning the status ($51).

Each charger may always have its CAN B setup to receive the same status message ($51) in order to detect if a second charger 14 is present. If a charger 12, 14 receives the status message ($51) on its CAN B then it may determine that a second "slave" charger 14 is present and it should take on the role of "master" and begin load balancing as required. To do this it may take in the command ($51) from the vehicle on CAN A and determine what portion of the request it may handle, and send the other portion via CAN B using a "cloned" command message ($50) which the slave charger may simply interpret as a command from the vehicle, unaware that the master charger is even in the system.

The master may also then take the slave's status response ($51) it receives on CAN B and combine the information in it with its own, and send a cumulative status message ($51) to the vehicle via CAN A. If at any point the master charger 12 stops receiving the slave charger's status message ($51) on CAN B for some defined timeout period, it can simply default back into normal mode as if it was the only charger present. Since control pilot and proximity detect signals 34, which due to design can not be simply split to the two chargers, the master charger 12 may need to package the two signals statuses and send them via a special message (for example, ID $40) on CAN B that tells the slave charger 14 to ignore the actual physical signals (which won't be connected) and instead use the supplied values. Upon receiving this message, the slave 14 may substitute the real physical signal values with the supplied status values from the can message and may use the supplied AC current limit in place of the actual one that would be decoded from the control pilot signal 34.

Figure 5:
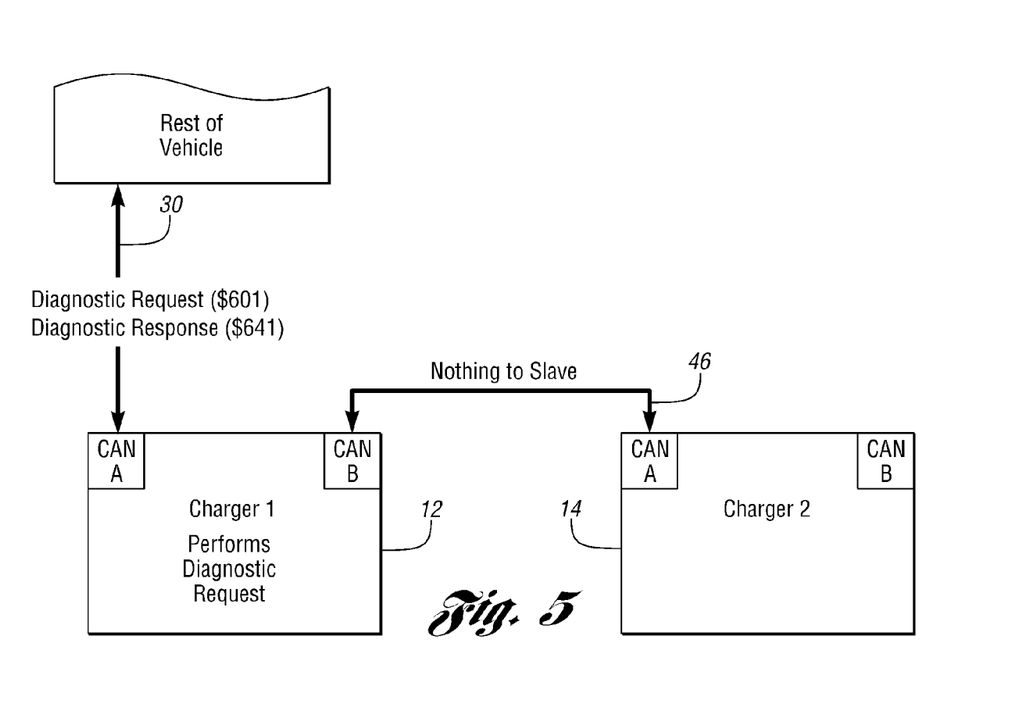

Both chargers 12, 14 may be configured to receive two physical Diagnostic IDs. One may be used to request information from the master charger, and the second may be used to send the request through the master 12 and to the slave charger 14. For example, assuming that the Diagnostic ID for the Master is $601 for the request and $641 for the response and for the Slave they are $602/$642 respectively, in the event a technician requests diagnostic information from the master charger, then they would send a diagnostic request using ID $601, and look for the response using ID $641, as shown in FIG. 5. In this case the master would handle performing the requested action.

Figure 6:
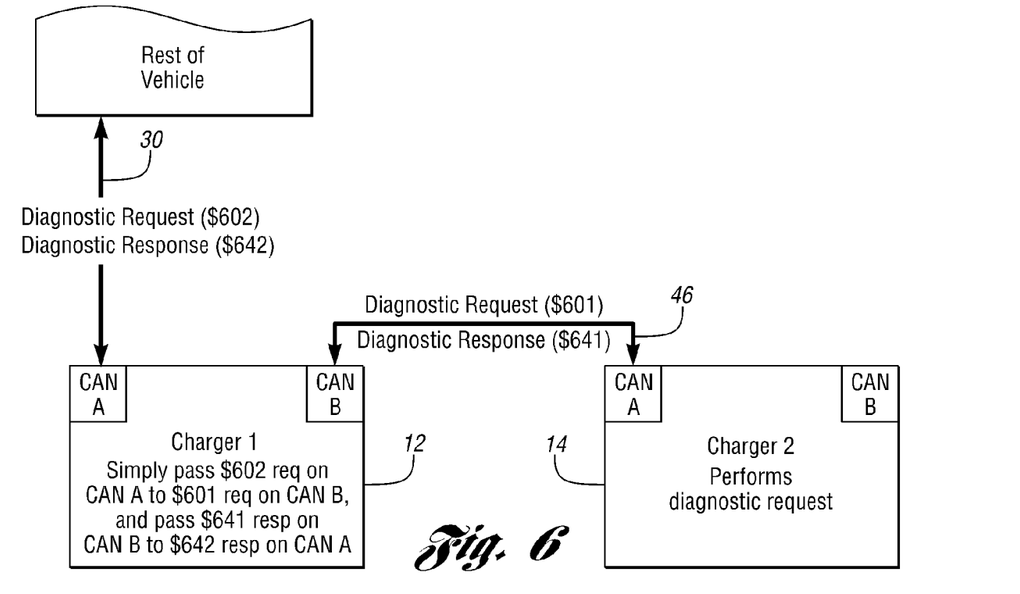

In the event a technician requests diagnostic information from the slave charger 14 in a two charger system, then they can send a diagnostic request using ID $602, and look for the response using ID $642. In this case the master 12 would simply pass the diagnostic request to the slave charger 14 via CAN B, by sending a "cloned" $601 request, as shown in FIG. 6. The slave 14 would then perform the action and return a response $641, that the master 12 would then pass back to the system via CAN A using ID $642.

Figure 7:
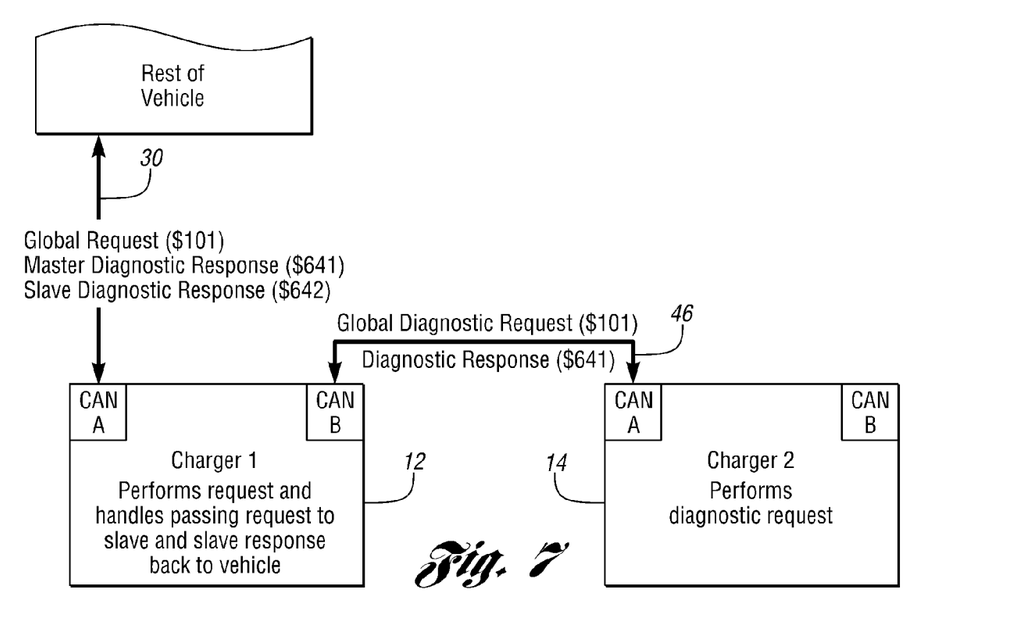

For the case of global diagnostic requests (ID $101 for example), the master may first pass along the request via CAN B to the slave, then perform the requested action, and then send its own response ($641), and then pass along the response from the slave ($642), as shown in FIG. 7. This design should allow for simple reflashing of both chargers 12, 14 by allowing a technician to simply perform one reprogramming session with the Master using its physical ID ($601), and then once complete repeat the process for the slave using its physical ID ($602). For the slave reprogramming the master node may simply take the diagnostic requests from CAN A ($602) and reroute them to CAN B using ID $601 to the slave. It may then take the responses from the slave ($641) it receives on CAN B and reroute them onto CAN A using ID $642.

Below is a table representing CAN messages that may need to be configured based on the simplified example messages listed for the cascaded connection arrangement shown in FIG. 3.

| | | Configuration | |
|---|---|---|---|
| ID | Description | CAN A | CAN B |
| Functional | | | |
| $ 50 | Vehicle Command | Rx | Tx |
| $ 51 | Charger Status | Tx | Rx |
| $ 40 | Bypass Mode | Rx | Tx |
| Diagnostic | | | |
| $101 | Global Diagnostic Request | Rx (D) | Tx |
| $601 | Master Physical Request | Rx (D) | Tx |
| $602 | Slave Physical Request | Rx | -NA- |
| $641 | Master Diagnostic Response | Tx (D) | Rx |
| $642 | Slave Diagnostic Response | Tx | -NA- |

Figure 8:
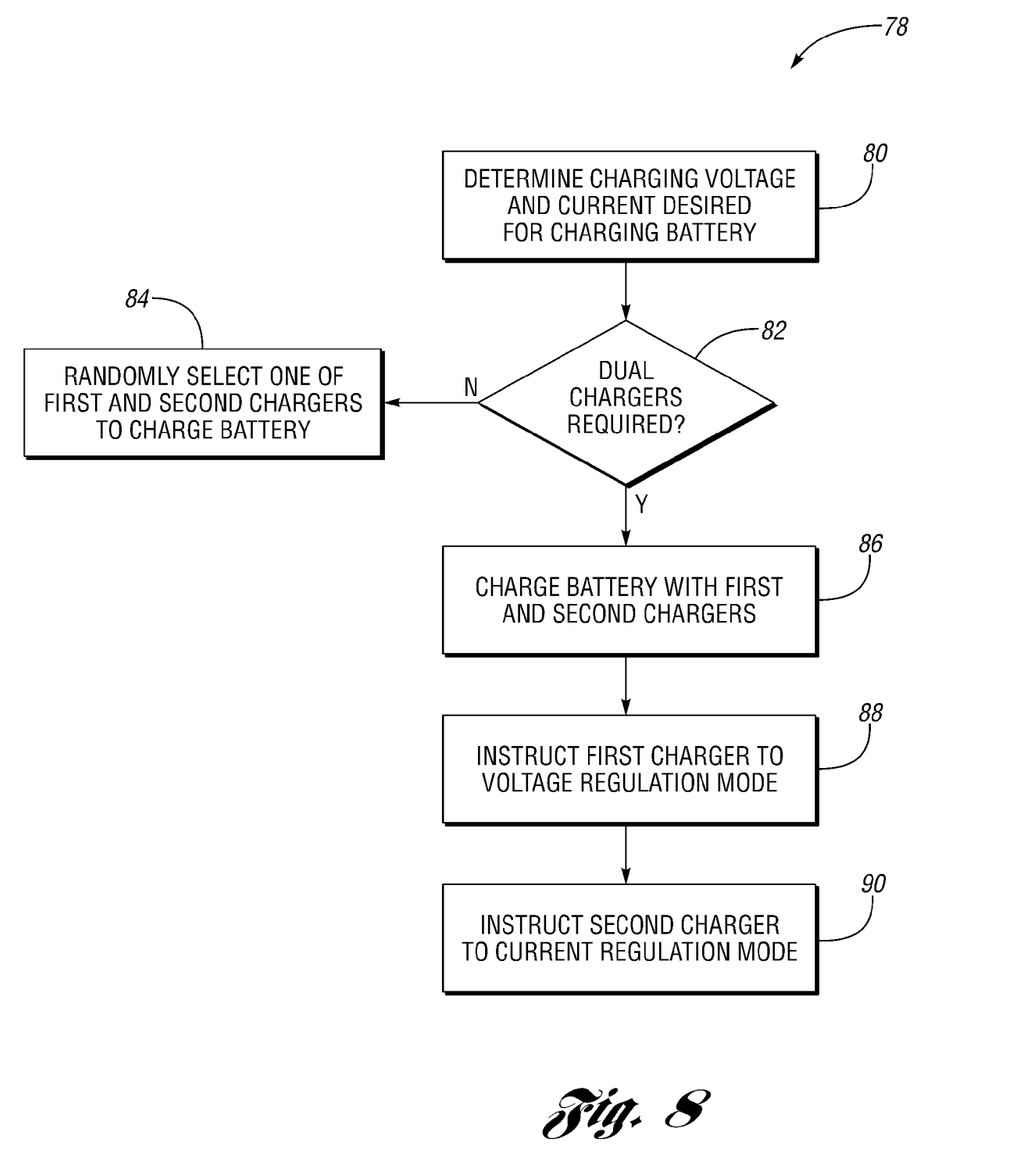
FIG. 8 illustrates a flowchart of a method for regulating charging of a dual-charger system in accordance with one non-limiting aspect of the present invention.

Tx = Transmit message
Rx = Receive message
(D) = configured to be handled by diagnostics FIG. 8 illustrates a flowchart 78 of a method for regulating charging of a dual-charger system in accordance with one non-limiting aspect of the present invention. The method may be implemented with the assistance of a computer-readable medium or other logically executing element residing in one or more of the chargers 12, 14 and/or vehicle controllers. For exemplary purposes, the method is predominately described with respect to a dual-charger configuration where a first charger 12 is connected in parallel with a second charger 14 and both chargers 12, 14 receive a common AC supply through an EVSE 24 or other interface sufficient to provide energy from a source outside of the vehicle. Of course, the present invention is not intended to be so limited and fully contemplates the source being within the vehicle and having other configurations for the chargers 12, 14.

Block 80 relates to determining a charging voltage and a charging current desired for charging the battery 16. The charging voltage and current may be determined by a battery monitoring system (BMS), one or more of the first and second chargers 12, 14, or some other device within the vehicle. The charging voltage and current may be based on a current voltage level and current level of the battery, operating/design characteristics of the battery, operation characteristics and capabilities of the vehicle, and other parameters sufficient to determine the amounts of the charging voltage and current needed to facilitate charging the battery 16 to a desired level. The charging voltage and currents may change dynamically during charging and with operation of the vehicle and may be correspondingly adjusted throughout the charging process such that the outputs of the first and/or second chargers 12, 14 may be similarly adjusted therewith.

Block 82 relates to determining whether both of the first or second chargers 12, 14 or more chargers if more chargers are available, are needed to provide the charging voltage and current. One non-limiting aspect of the present invention contemplates configuring the dual chargers 12, 14 to be required during normal charging activities so that power demands on each charger 12, 14 can be less than that which would otherwise be required with the use of a single charger. As such, the need to supply the charging voltage and current from only one of the first and second chargers 12, 14 may be limited to situations in which lower voltages and currents are needed for charging. Block 84 relates to randomly selecting one of the chargers 12, 14 to provide the charging voltage and current when only one charger is needed with the aim of repeated, single-charger charging events to be equally distributed between the first and second chargers 12, 14.

Block 86 relates to charging the battery 16 with voltages and currents being provided from each of the first and second chargers 12, 14. The voltages and currents contributed by the first and second chargers 12, 14 are referred to respectively and correspondingly as first and second voltages and first and second currents. In the event the first and second chargers 12, 14 are operable to convert AC energy to DC energy, the first and second voltages and first and second currents may be DC. Of course, the present invention is not intended to be so limited and fully contemplates the chargers 12, 14 being operable to regulate AC energy to AC energy, DC energy to DC energy and/or DC energy to AC energy. The first and second chargers 12, 14 may be operated while regulating the charging of the battery by selecting one of the chargers 12 to implement voltage control, shown to be the first charger (Block 88), and the other one of the chargers 14 to implement current control, shown to be the second charger (Block 90).

The voltage and current control modes may be implemented with different ones of the first and second chargers 12, 14 in order to prevent instability, continuous adjustments, and other unnecessary controls that could be produced in the event each charger 12, 14 was responsible for regulating current and voltage control. One non-limiting aspect of the present invention contemplates commanding one of the chargers 14 to provide more voltage than the other charger 12 and the other one of the chargers 12 to provide more current than the other charger 14 and then instructing each lower voltage and lower current limited ones of the chargers 12, 14 to respectively be responsible for regulating voltage and current.

The charger responsible for regulating voltage, shown as the first charger 12, will monitor the net voltage to the battery 16, which is the combination of the actual voltages output from the first and second chargers 12, 14. In the event the net voltage is greater than the charging voltage, the first charger 12 will decrease the first voltage by a corresponding amount, and in the event the net voltage is less than the charging voltage, the first charger 12 will increase the first voltage by a corresponding, proportional amount. The second charger 14 will not require any corresponding adjustment, i.e., it will not require a corresponding instruction to increase/decrease voltage, since it will automatically be pulled to the same voltage as the first charger 12 due to the second charger 14 having a greater voltage limit than the first charger 12.

The charger responsible for regulating current, shown as the second charger 14, will monitor the net current to the battery 16, which is the combination of the actual currents output from the first and second chargers 12, 14. In the event the net current is greater than the charging current, the second charger 14 will decrease the second current by a corresponding amount, and in the event the net current is less than the charging current, the second charger 14 will increase the second current by a corresponding, proportional amount. In order to evenly split the current demands, and thereby the power requirements of each charger 12, 14, the desired charging current may be equally split between each charger 12, 14, such that the first charger 12 provides half of the charging current and the second charger 14 provides the other half of the charging current. Any adjustments thereafter may be made by the second charger 14 and without corresponding instructions to the first charger 12 since the first charger 12 has a greater current limit than the second charger 14.

Embodiments of the invention relate to the development of a multiple on-board HV charger control strategy. Identical chargers may be installed in the vehicle and the chargers contain software controls which allow one to act as master and one to act as slave so that both chargers can run in the most efficient, balanced, and optimized manner depending on supply power and demand of the HV battery.

Example new features include operating two identical on-board chargers in parallel while optimizing output, balance, and efficiency in a master/slave role. Embodiments of the invention can reduce the vehicle charge time by one-half over a single charger at the same rated output.

In more detail, charge time is dictated by battery capacity, battery charge state, available mains power, and on-board charger output. With embodiments of the invention, there is flexibility to install one, two, or more identical chargers in a vehicle to reduce charge time all with the same on board charger.

There are a variety of ways to implement embodiments of the invention.

In one example with two chargers (charger 1 and charger 2), charger 1 and charger 2 are connected to the CAN bus, and are operated in parallel. The battery management system (BMS), in this case, performs the load sharing logic to balance the load between the two chargers, and communicates with the two chargers.

In another example with two chargers (charger 1 and charger 2), charger 1 and charger 2 are again connected to the CAN bus in parallel. In this case, charger 1 does the load sharing and communicates to charger 2. The BMS talks to charger 1 only, and if charger 1 is unavailable, the BMS can switch to charger 2.

It is appreciated that the CAN bus is an example communication bus. Various implementations of the invention including those discussed above, those discussed below, and others, may be implemented with any appropriate communication bus, communication busses, or other communication mechanisms. With regard to communication busses, examples include CAN, LIN, SPI, FlexRay, MOST.

In another example with two chargers (charger 1 and charger 2), charger 1 and charger 2 are connected to CAN bus CAN 1 in parallel. The BMS is also connected to CAN 1. Charger 1 and charger 2 are also connected to a second CAN bus CAN bus CAN 2. In this case, charger 1 or charger 2 could be the master. The BMS talks to the master charger, and the other charger ignores the BMS. The master charger, in turn, tells the slave charger what to do over CAN 2. In some implementations, if the master charger is unavailable, the slave charger switches to the master role.

In another case, charger 1 and charger 2 are both connected to CAN bus CAN 1. A separate gateway/controller is also connected to CAN 1. The BMS connects to the gateway/ controller. In this case, the gateway translates CAN messages and splits the task between charger 1 and charger 2. Put another way, both charger 1 and charger 2 are functioning as slave devices, with the gateway/controller preforming the master role in response to the BMS.

It is appreciated that there are many ways to implement the contemplated master/slave strategy. One particular aspect of an implementation is the technique to determine which charger is the master.

In one possible approach, the chargers themselves are identical, and the harness connections to them are unique. In this approach, each charger will have a "master indication" digital input it will debounce and decode after a reset to determine if it is supposed to be the master or the slave in the system. One of the harness connectors will be the "master connection" and contain a digital signal with a "high" level and the other will be a "slave connection" and have a digital signal with a "low" level. The charger that is connected to the "master connection" with the "master indication" set high will assume the role of the master charger and configure its CAN driver to use the master node message set. The charger that is connected to the "slave connection" with the "master indication" set low will assume the role of the slave charger and configure its CAN driver to use the slave node message set.

Of course, determining master and slave roles in the above way using the harness connections is exemplary. Other techniques are possible. For example, some implementations may involve configuring the chargers themselves as master or slave. For example, jumper settings or firmware settings may be used for this purpose. In another example, chargers connected to a common bus may communicate with each other and agree on which charger is the master charger, with the remaining one or more chargers being slave chargers. Selecting in this manner may involve any suitable "voting" implementation among the chargers. For example, chargers may communicate their serial number, and the charger with the lowest (or highest) serial number may take the role of master. In another option, chargers may each generate a random number and the charger having the lowest (or highest) random number may become the master. Put another way, it is appreciated by one of ordinary skill in the art that any suitable approach for selecting the master may be employed.

Figure 9:
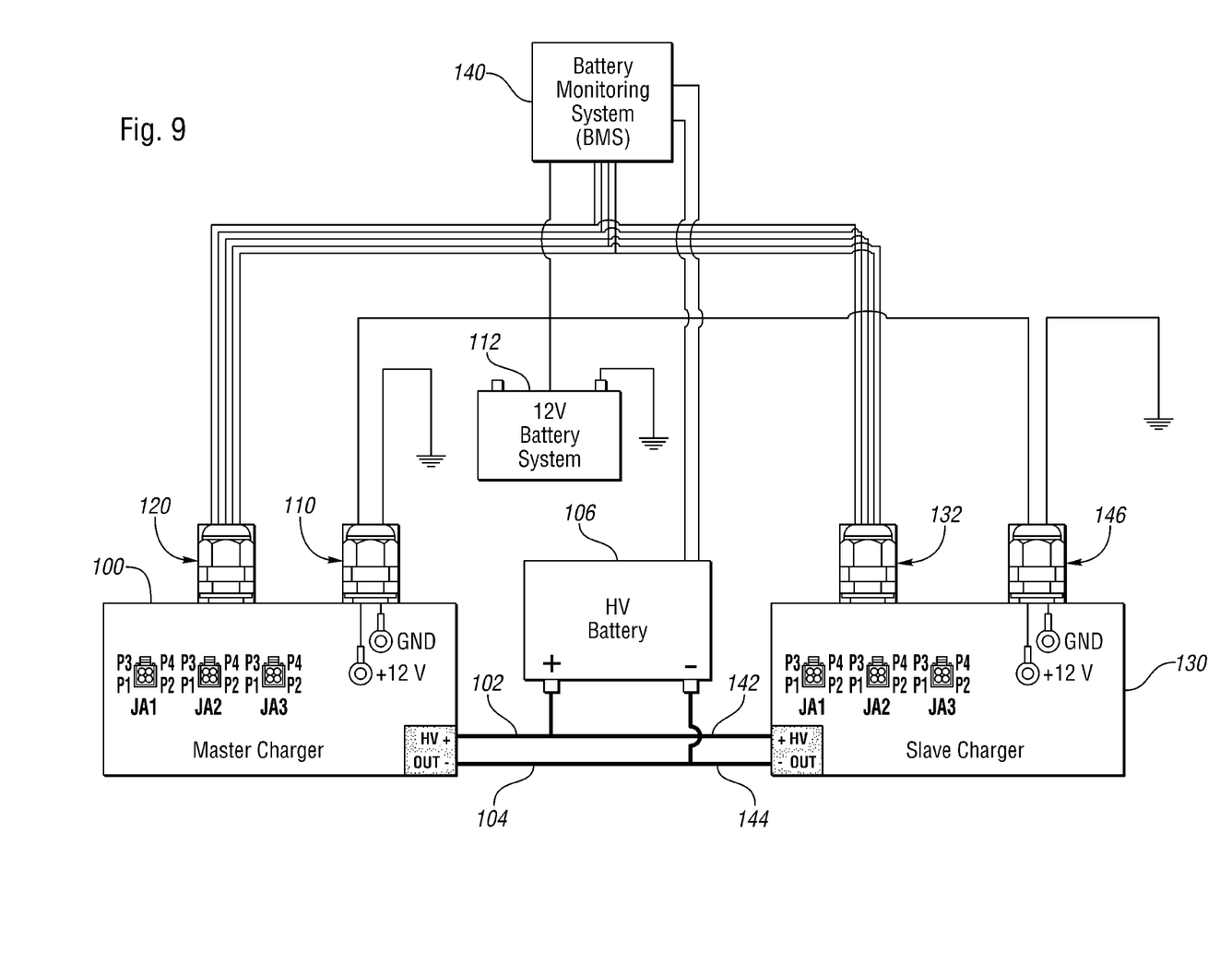
FIG. 9 illustrates further non-limiting aspects of the present invention.

As shown in FIG. 9, a master charger 100, slave charger 130, HV battery 106, and BMS 140 are arranged.

As shown, the master charger 100 has HV outputs 102, 104 connected to the HV battery 106. The master charger 100 also has an optional connection 110 to a 12 volt battery system 112. The master charger 100 also receives several signals over a master charger vehicle harness connection 120. In more detail, these signals include CAN low and CAN high communication signals, a charger enable signal, and a master indication digital input signal pair.

The slave charger 130 is essentially identical to the master charger 100, and receives a slave charger vehicle harness signal connection 132. However, at the slave charger 130, the slave charger 130 receives a slave indication digital input (note the slave indication is achieved by reversing the wires from the way that they connect to the master charger). That is, in the illustrated example, master line 1 is a green wire and master line 2 is a black wire; and slave line 1 is the black wire and slave line 2 is the green wire.

Also shown in FIG. 9 are the HV outputs 142, 144 of the slave charger, and connection 146

It is appreciated that FIG. 9 only illustrate examples for additional aspects of the invention. Various implementations are possible.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for teaching one skilled in the art to variously employ the present invention. The features of various implementing embodiments may be combined to form further embodiments of the invention.

What is claimed is:

1. A charger system for use in a vehicle to charge a vehicle battery, the charger system comprising:
   a first charger configured to connect to a vehicle bus, having a first master indication digital input, and being configured to decode the first master indication digital input to determine a first role as either a master charger or a slave charger, wherein when the first role is determined as the master charger the first charger configures the connection to the vehicle bus to use a master node message set, and when the first role is determined as the slave charger the first charger configures the connection to the vehicle bus to use a slave node message set; and
   a second charger configured to connect to the vehicle bus, having a second master indication digital input, and being configured to decode the second master indication digital input to determine a second role as either a master charger or a slave charger, wherein when the second role is determined as the master charger the second charger configures the connection to the vehicle bus to use the master node message set, and when the second role is determined as the slave charger the second charger configures the connection to the vehicle bus to use the slave node message set;
   wherein the first and second chargers are configured to communicate with each other and agree on which charger is to serve as the master charger, with the other charger to serve as the slave charger, and wherein the first charger and the second charger are configured to communicate their serial numbers, and which charger is the master charger is determined based on the serial numbers.

2. The charger system of claim 1 further comprising:
   a vehicle wiring harness connected to the first charger and connected to the second charger, the vehicle wiring harness being configured to connect the first charger and the second charger to the vehicle bus.

3. The charger system of claim 2 wherein the vehicle wiring harness is configured such that a pair of wires connects to the first master indication digital input, and the pair of wires also connects to the second master indication digital input in a reversed configuration.

4. The charger system of claim 1 wherein a master charger using the master node message set receives commands from a battery management system and sends commands to a slave charger, and wherein the slave charger receives commands from the master charger.

5. A charger system for use in a vehicle to charge a vehicle battery, the charger system comprising:
   a first charger configured to connect to a vehicle bus; and
   a second charger configured to connect to the vehicle bus;
   wherein the first charger and the second charger are configured to communicate with each other and agree on which charger is a master charger, with the other charger being a slave charger, wherein when a particular charger is the master charger, the particular charger configures its connection to the vehicle bus to use a master node message set, and when the particular charger is the slave charger, the particular charger configures its connection to the vehicle bus to use the slave node message set, and wherein the first charger and the second charger are configured to communicate their serial numbers, and which charger is the master charger is determined based on the serial numbers.

6. The charger system of claim 5 wherein a master charger using the master node message set receives commands from a battery management system and sends commands to a slave charger, and wherein the slave charger receives commands from the master charger.

7. A charger system for use in a vehicle to charge a vehicle battery, the charger system comprising:
  a first charger configured to connect to a vehicle bus, and configured to serve as a master charger to use a master node message set or as a slave charger to use a slave node message set; and
  a second charger configured to connect to the vehicle bus, and configured to serve as a master charger to use a master node message set or as a slave charger to use a slave node message set;
  wherein the first and second chargers are configured to communicate with each other and agree on which charger is to serve as the master charger, with the other charger to serve as the slave charger, wherein the master charger configures its connection to the vehicle bus to use the master node message set and the slave charger configures its connection to the vehicle bus to use the slave node message set, wherein the master charger using the master node message set receives commands from a battery management system and sends commands to the slave charger, and wherein the slave charger receives commands from the master charger, and wherein the first charger and the second charger are configured to each communicate a random number, and which charger is the master charger is determined based on the random numbers.

8. The charger system of claim 7 further comprising:
  a vehicle wiring harness connected to the first charger and connected to the second charger.

9. A charger system for use in a vehicle to charge a vehicle battery, the charger system comprising:
  a first charger configured to connect to a vehicle bus; and
  a second charger configured to connect to the vehicle bus;
  wherein the first charger and the second charger are configured to communicate with each other and agree on which charger is a master charger, with the other charger being a slave charger, wherein when a particular charger is the master charger, the particular charger configures its connection to the vehicle bus to use a master node message set, and when the particular charger is the slave charger, the particular charger configures its connection to the vehicle bus to use the slave node message set, and wherein the first charger and the second charger are configured to each communicate a random number, and which charger is the master charger is determined based on the random numbers.

10. The charger system of claim 9 wherein a master charger using the master node message set receives commands from a battery management system and sends commands to a slave charger, and wherein the slave charger receives commands from the master charger.

* * * * *